Patented June 12, 1945

2,378,283

UNITED STATES PATENT OFFICE 2,378,283

PIGMENT DYESTUFFS AND PROCESS FOR THE IMPROVEMENT OF THE TINCTORIAL PROPERTIES OF PIGMENTS

Armin Bucher, Basel, Switzerland, assignor to the Swiss firm of Society of Chemical Industry in Basle, Basel, Switzerland No Drawing. Application February 4, 1943, Serial No. 474,752. In Switzerland December 10, 1941

4 Claims. (Cl. 241—22)

It is known that the tinctorial properties of pigments are exceedingly dependent on the physical condition or degree of dispersion of the pigment in question. According to the conditions obtaining, one and the same pigment can be either valueless or exceedingly valuable.

The surprising observation has now been made that insoluble organic dyestuffs can be converted into very valuable pigments by grinding them with calcined calcium chloride, and hereupon removing the calcium chloride by treatment with water.

In many cases it is advisable to add to the calcined calcium chloride dispersing agents which are capable of being removed by solvents (preferably aqueous), and which may be anion active auxiliary products. Examples of such dispersing agents are: the sodium salt of the sulphuric acid ester of dodecyl alcohol, of sulphonated $\mu$-heptadecyl-benzimidazol, of disulphonated $\mu$-heptadecyl-N-benzylbenzimidazol, of oleoyl-N-methyl-taurine, ethers from aliphatic alcohols containing 10 to 20 carbon atoms and 10 to 20 molecules of ethylene oxide, sulphite cellulose waste liquors, sodium benzylsulphanilate, etc. Products which contain a long aliphatic chain are especially active.

As already mentioned, the success of this new method is to be designated as completely surprising, more particularly on account of the excellent tinctorial strength and the brilliance of the pigments obtained. The process is applicable to the most varied types of organic pigment dyestuffs, for example, complex metal compounds, such as phthalocyanines (for example, copper phthalocyanine), halogenated copper phthalocyanines, other colored organic compounds, such as vat dyestuffs, water-insoluble azo-dyestuffs.

The following examples illustrate the invention but are not to be regarded as limiting it in any way:

Example 1

4 gms. of copper phthalocyanine, prepared by heating phthalonitrile with cuprous chloride in nitrobenzene and a little caustic soda, are ground with 8 gms. of dehydrated calcium chloride and 0.4 gm. of the sodium salt of the acid sulphuric acid ester of dodecyl alcohol for 24 hours in an efficient roller mill consisting of V2A steel. The ground material is then heated with 400 ccs. of water to 98° C. whilst stirring, filtered at the pump, washed with 500 ccs. of warm water, dried on the water bath and pulverized. 4.1 gms. of a soft, brilliant blue dyestuff powder are obtained which can be tested in the following manner as a wallpaper color or as a printing color:

(a) Wallpaper color:
   0.5 gm. of the above dyestuff powder is rubbed in a mortar for 2 minutes with
   2 ccs. of a 10 per cent. gum arabic solution;
   12 gms. of whiting and a further
   10 ccs. of gum arabic 10 per cent. solution are added, and rubbing is continued for a further 3 minutes; finally, the mixture is diluted with
   8 ccs. of 10 per cent. gum arabic solution.

The prepared color is brushed on to wallpaper with a broad, stiff brush and is carefully dispersed with a smoothing brush. When dry, a blue coat of great purity and tinctorial strength is obtained.

(b) Printing color:
   1 gm. of the above dyestuff powder is ground as fine as possible on the three-roller mill with
   5 gms. of zinc white and
   4 gms. of lithographic varnish.

The blue printing color thus obtained is applied to a glass plate. The color strength and purity of shade of this printing color are very good.

The same result is obtained if 12 gms. of calcium chloride be used without the sulphuric acid ester of dodecyl alcohol.

If the grinding has been carried out in the presence of water, for example, 4 gms. of copper phthalocyanine, 30 gms. of water, 0.4 gm. of the sodium salt of the acid sulphuric acid ester of dodecyl alcohol, a deeply colored liquid is obtained from which it is impossible to isolate a usable pigment by simple means. This difficulty is not circumvented by addition of calcium chloride to the water.

If wet grinding without dispersing agent is carried out, or if the dry copper phthalocyanine ground without addition is merely stirred up with water in presence of the sodium salt of the acid sulphuric acid ester of dodecyl alcohol, results are obtained which are appreciably poorer than those obtained in the first and fourth paragraphs of this example.

Example 2

4 gms. of Ciba blue 2B (Colour Index No. 1184), 8 gms. dehydrated calcium chloride and 0.4 gm. of the sodium salt of the acid sulphuric acid ester of dodecyl alcohol are ground together for 22 hours. The ground material is then stirred for 1 hour at 98° C. with 500 ccs. of water, filtered with suction, washed with 500 ccs. of water, dried on the water bath, and pulverized. 4 gms. of soft dyestuff powder of great purity and tinctorial strength are obtained.

Example 3

4 gms. of the azo-dyestuff obtained from diazotized 1-amino-2-nitro-4-chlorobenzene and the ortho-chloranilide of acetoacetic acid are ground for 22 hours with 8 gms. of anhydrous calcium chloride and 0.4 gm. of the sodium salt of the acid sulphuric acid ester of dodecyl alcohol. The ground material is stirred for 1 hour at 98° C. with 500 ccs. of water, filtered at the pump, washed, dried on the water bath, and pulverized. The soft, brilliant yellow dyestuff powder thus obtained is purer and tinctorially stronger than the parent material.

Similar results are obtained if instead of the above yellow pigment the insoluble azo-dyestuffs from the ortho-anisidide of 2:3-hydroxynaphthoic acid and diazotized 1-amino-3-chlorobenzene or from the ortho-toluidide of 2:3-hydroxynaphthoic acid and diazotized 1-amino-2-methyl-4-nitrobenzene are used.

What I claim is:

1. Process for the improvement of the tinctorial properties of copper phthalocyanine pigments, comprising the dry grinding copper phthalocyanine with calcined calcium chloride and hereupon removing the calcium chloride by treatment with water.

2. Process for the improvement of the tinctorial properties of copper-phthalocyanine pigments, comprising the dry grinding copper-phthalocyanines with calcined calcium chloride in the presence of anion-active dispersing agents and hereupon removing the calcium chloride and the anion-active dispersing agents by treatment with water.

3. Process for the improvement of the tinctorial properties of organic pigment dyestuffs, comprising the dry grinding of the said dyestuffs with calcined calcium chloride and hereupon removing the calcium chloride by treatment with water.

4. Process for the improvement of the tinctorial properties of organic pigment dyestuffs, comprising the dry grinding of the said dyestuffs in the presence of an anion-active dispersing agent with calcined calcium chloride and hereupon removing the calcium chloride and the anion-active dispersing agent by treatment with water.

ARMIN BUCHER.